United States Patent
Vanderah et al.

(10) Patent No.: US 6,945,125 B2
(45) Date of Patent: Sep. 20, 2005

(54) HIGH RESOLUTION PULSE COUNT INTERFACE

(75) Inventors: Richard J. Vanderah, Marshalltown, IA (US); David L. Smid, Marshalltown, IA (US); Douglas B. Roberts, Garwin, IA (US); David W. Shollenbarger, Marshalltown, IA (US)

(73) Assignee: Daniel Industries, Inc., Houston, TX (US)

( * ) Notice: Subject to any disclaimer, the term of this patent is extended or adjusted under 35 U.S.C. 154(b) by 0 days.

(21) Appl. No.: 10/726,402

(22) Filed: Dec. 3, 2003

(65) Prior Publication Data

US 2005/0120806 A1    Jun. 9, 2005

(51) Int. Cl.⁷ ............................................. G01F 15/00
(52) U.S. Cl. ................................. 73/861.77; 73/861.94
(58) Field of Search .................... 73/861.75, 861.77, 73/861.78, 861.79, 861.88, 861.93, 861.94

(56) References Cited

U.S. PATENT DOCUMENTS

| | | | | |
|---|---|---|---|---|
| 4,241,605 A | * | 12/1980 | Hendriks et al. | 73/861.94 |
| 5,831,176 A | * | 11/1998 | Morgenthale et al. | 73/861.77 |
| 5,902,938 A | * | 5/1999 | Beaudoin et al. | 73/861.77 |
| 6,026,838 A | * | 2/2000 | Nicewonger et al. | 73/196 |
| 6,098,456 A | * | 8/2000 | Munck | 73/275 |
| 6,611,769 B2 | * | 8/2003 | Olson | 73/275 |

* cited by examiner

*Primary Examiner*—Harshad Patel
(74) *Attorney, Agent, or Firm*—Conley Rose, PC; Mark E. Scott

(57) ABSTRACT

A high resolution pulse count interface is situated between a positive displacement (PD) meter and a flow computer. A magnetic wheel attaches to the PD meter, with the interface using Hall Effect sensors to detect the rotation of the wheel. A pulse prediction algorithm and weighting algorithms are used to improve resolution for the flow computer to enable real time flow rate calculations.

22 Claims, 7 Drawing Sheets ically acute in custody transfer applications, where custody of the fluid in the pipeline passes from a first owner to a second owner, and payment for the fluid may travel in the opposite direction.
HIGH RESOLUTION PULSE COUNT INTERFACE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

In the oil and gas industry, it is common to measure the volume and rate of flow of a fluid through a pipeline. The need for an accurate measurement is particularly acute in custody transfer applications, where custody of the fluid in the pipeline passes from a first owner to a second owner, and payment for the fluid may travel in the opposite direction.

A variety of meters are employed to measure the flow through a pipeline. One known type of meter is a positive displacement (PD) meter. FIG. 1A shows the general construction for the top works of a PD meter 100. The bottom 110 of a PD meter housing is suitable to attach to the internals of the PD meter by, e.g., screws or bolts. The internals of the PD meter is inserted into the pipeline to intercept the fluid flow. Fluid from the pipeline is forced to flow through a PD meter tube and causes a shaft protruding from the top works of the PD meter to spin, with one revolution of the shaft corresponding to a predetermined volume of fluid flowing through the PD meter. The volumetric flow of the fluid may be determined from the number of revolutions of the rotating components of the flow meter. Examples of the more common PD meters are oscillating piston, nutating disc, oval gear, roots, vane, rotor, and multi-piston.

Conventional PD meters attach to an electric pulser through a mechanical linkage. As shown in FIG. 1B, a mating coupling may include an offset pair of pins with a short extension attached to the shaft protruding from the PD meter. A shaft from the electric pulser includes an extension that fits between the offset pair of pins. During installation of the electric pulser, its shaft is positioned above the PD meter coupling by a technician, requiring alignment of shafts on the electric pulser between the pair of pins on the coupling. The electric pulser is then fastened to the PD meter during installation by a blind mating. Because this is merely a blind mating, even an experienced technician may take ten to fifteen minutes to align and fasten the components properly. In addition, because this is a mechanical linkage, over time wear occurs leading to slippage.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1A:
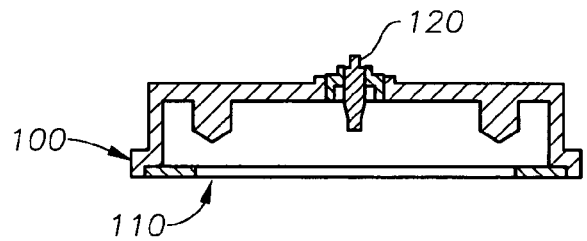
FIG. 1A is a side view of conventional top works for a positive displacement meter.
Figure 1B:
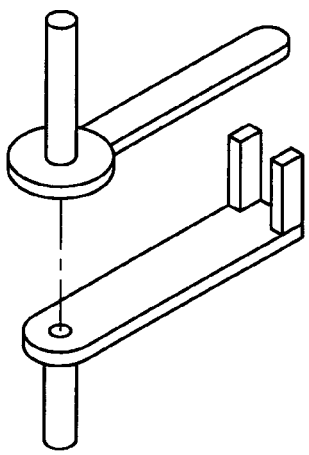
FIG. 1B is a side view of a coupling between a conventional electric pulser and a positive displacement meter.
Figure 2:
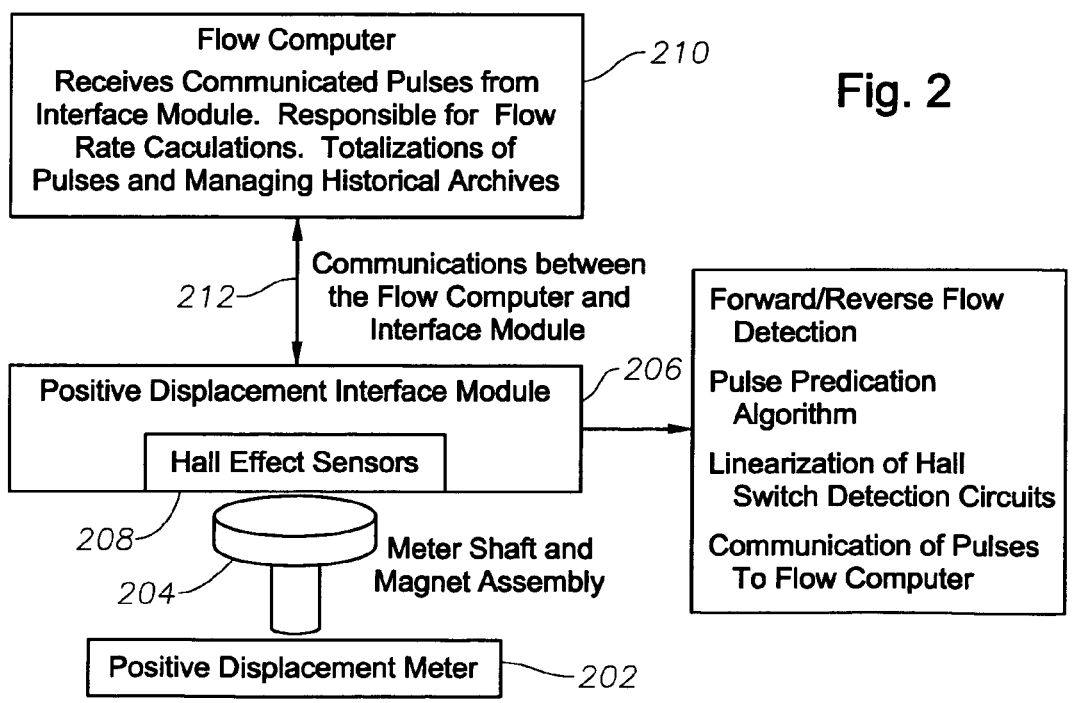
FIG. 2 is a block diagram of an embodiment according to the invention.

FIG. 2 shows a block diagram diagram of an embodiment of the invention. A positive displacement meter 202 attaches to a meter shaft and magnet assembly 204. A positive displacement interface module 206 includes Hall Effect sensors 208 proximate the magnet assembly 204. A flow computer, connected to any appropriate power source such as a battery with a charging circuit such as solar cells, attaches via a communication line 212 to the PD interface module 206. The flow computer acts as a digital flow corrector. A digital flow corrector calculates a normalized fluid flow by compensating for pressure and temperature.

Figure 3:
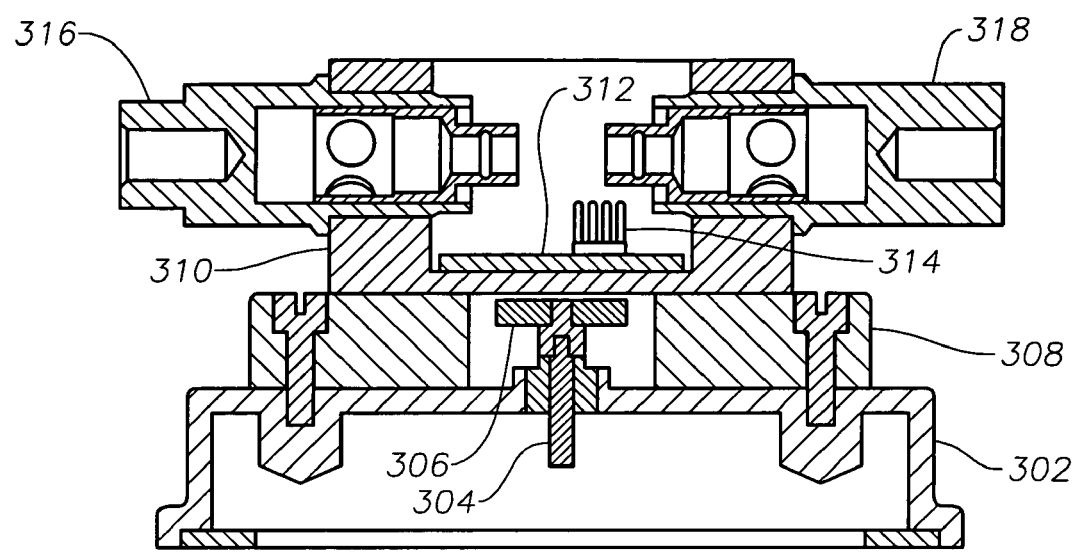
FIG. 3 is a cut-away view of an embodiment according to the invention.

Referring to FIG. 3, cut-away view of an embodiment of the invention is shown. A PD meter includes a top works cover 302 and attached shaft 304. Magnetic wheel 306 fixedly attaches to the top of the shaft 304 and is encompassed by adapter plate 308. Situated above adapter plate 308 is explosion-proof housing 310. Explosion-proof housing 310 contains the electronics necessary to detect the rotation of shaft 304 via magnetic wheel 306. This includes an electronics board 312 upon which are mounted a desired number of Hall sensors, such as five. Also attached to electronics board 312 are a pair of connectors 314 (only one connector is visible in FIG. 3). Pressure sensors 316 and 318 connect though connectors 314 to a microprocessor on the circuit board. Pressure sensors 316 and 318 also connect through tubing to fluid flow in the pipeline of interest. Explosion-proof housing 310 surrounds the entire assembly.

Figure 4:
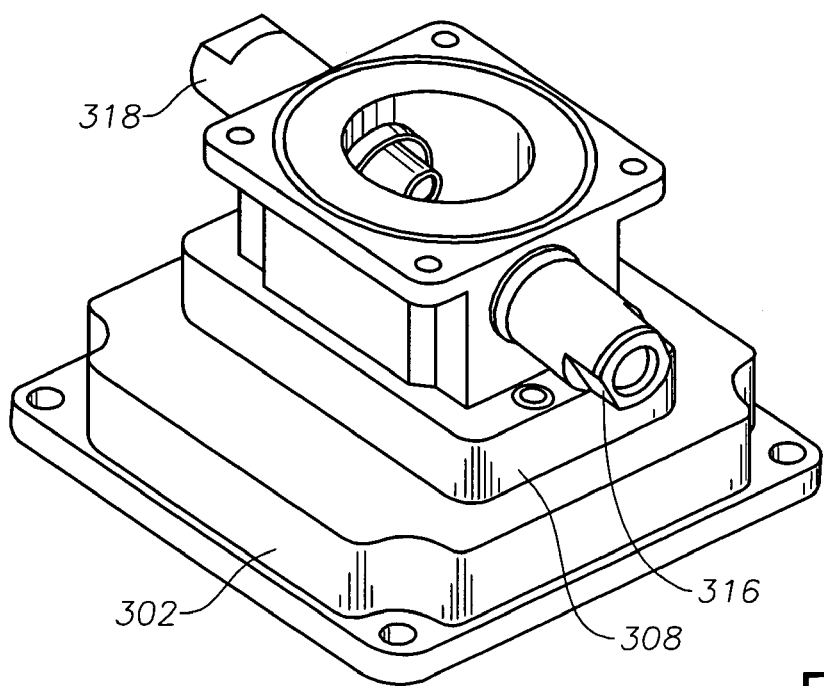
FIG. 4 is an external view of embodiment according to the invention.

FIG. 4 shows an external view of an interface according to one embodiment of the invention.

Figure 5:
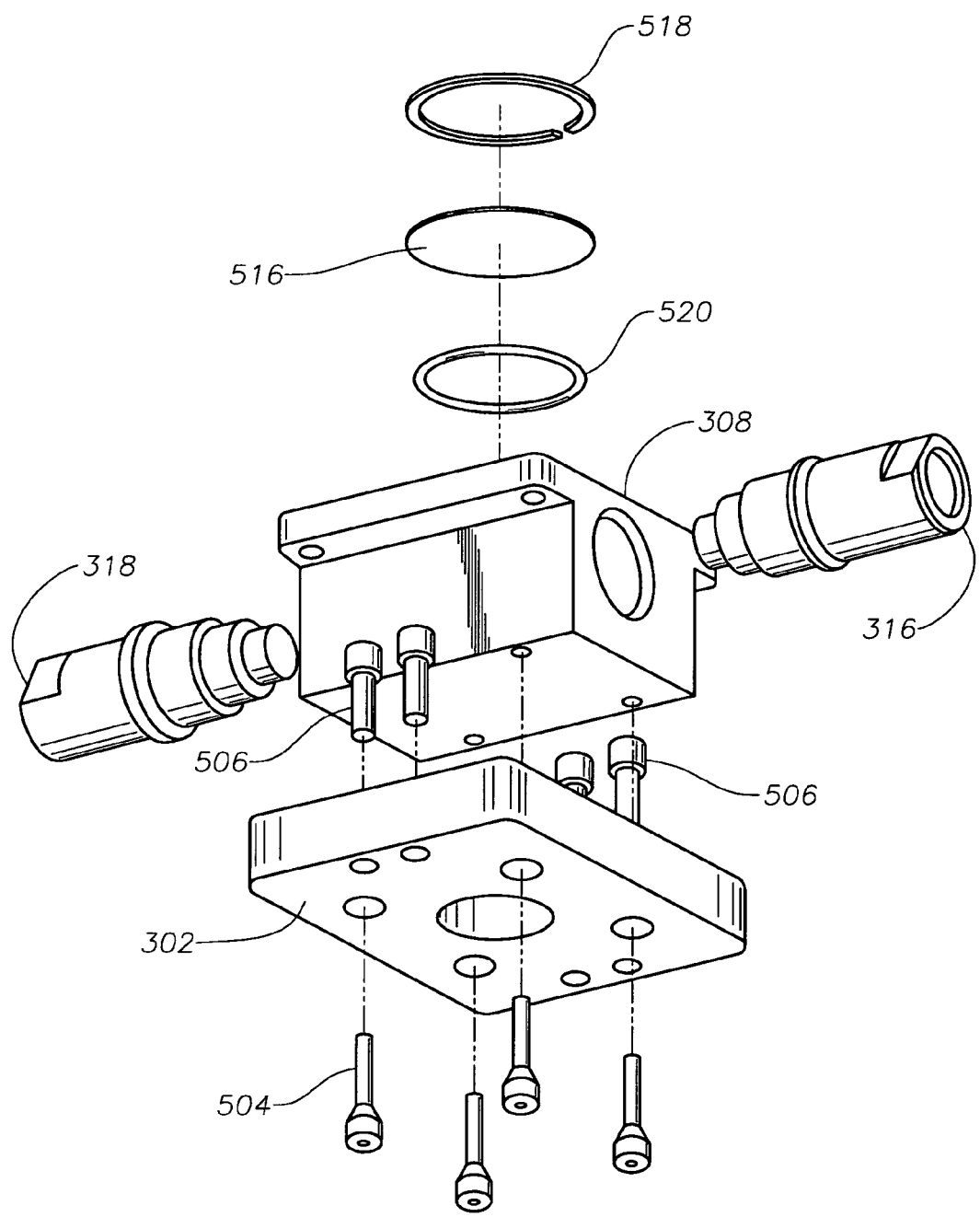
FIG. 5 is a lower exploded view of an embodiment according to the invention.

FIG. 5 shows an angled bottom view of an interface according to one embodiment of the invention. The interface includes adapter plate 302with a first set of bolts 504 and a second set of bolts 506. Pressure sensors 316 and 318 engage into explosion-proof housing 308. Circuit board 516 resides between retaining ring 518 and o-ring 520.

Figure 6:
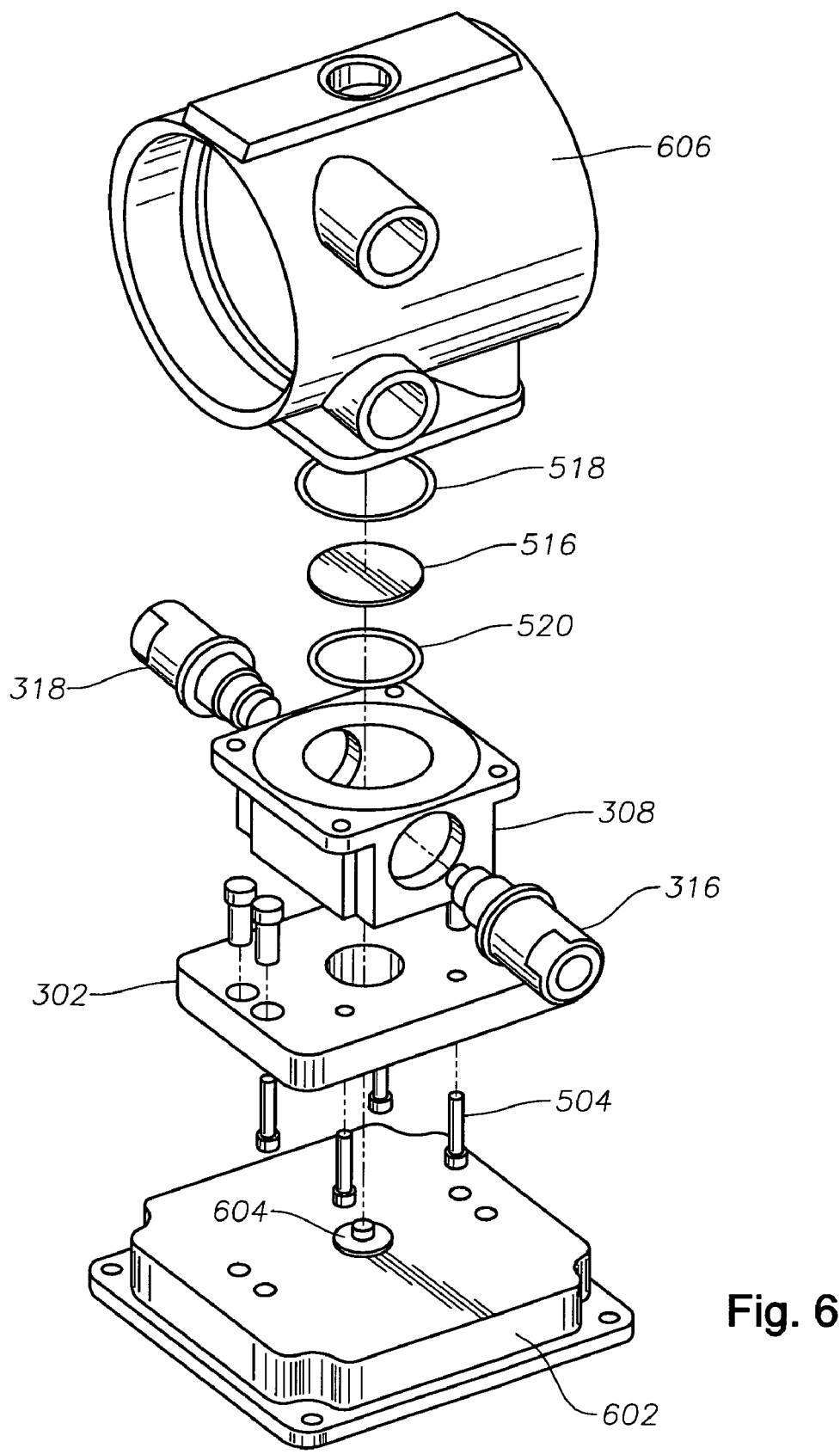
FIG. 6 is an upper exploded view of an embodiment according to the invention.

FIG. 6 shows an angled upper view of a PD meter-flow computer assembly according to one embodiment of the invention. In addition to the components shown in FIG. 5, FIG. 6 includes a top works cover 602 for the PD meter and magnetic wheel 604. A flow computer 606, housing a microprocessor and various electronics, resides above the interface. Different mounting hole configurations may be employed where bolting is used dependent upon different models of PD meters, for example.

Figure 7:
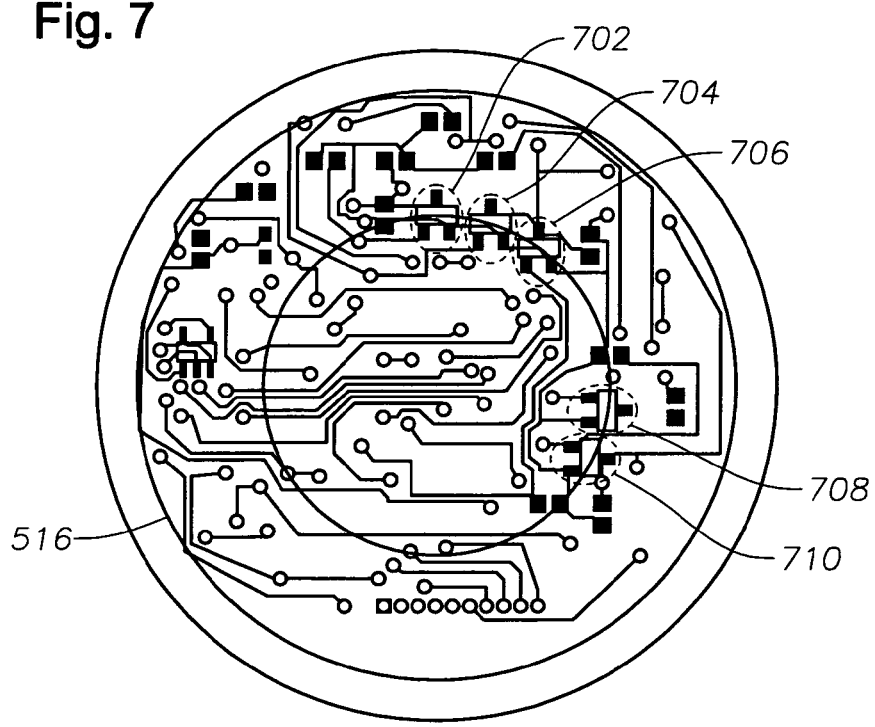
FIG. 7 is a schematic view of the bottom of a circuit board suitable for the invention.
Figure 8A:
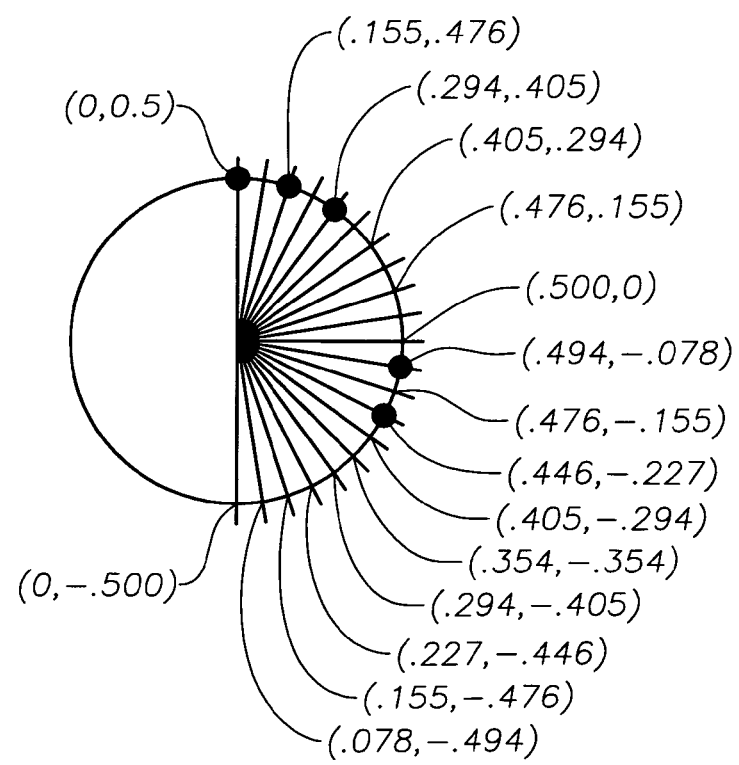
FIGS. 8A–8E are diagrams suitable to define angles of Hall Effect switches as they are arranged in the circuit diagram.

FIG. 7 is a schematic bottom view of a circuit board 516 suitable for inclusion in an interface. The circuit board 516 includes five Hall sensors 702, 704, 706, 708, 710. Referring to FIG. 8A, the relative angular positions of these five Hall sensors may be seen. A circle 802 having a one unit diameter is shown and is centered at (0, 0). Three Hall effect sensors

702, 704, 706 are located in the upper right (first) quadrant eighteen degrees apart at angular locations (0, 0.5), (0.155, 0.476), and (0.294, 0.405). Another two Hall effect sensors 708, 710 are located in the lower right (second) quadrant, at angular locations (0.494, −0.078) and (0.446, −0.227).

As is known to those of ordinary skill in the art, the function of a Hall sensor is based on the physical principle of the Hall Effect that if a magnetic field is applied perpendicularly to an electric conductor, a voltage (the Hall voltage) is generated transversely to the current flow direction in the conductor. A number of different Hall Effect sensors exist, including latched switching sensors, bipolar switching sensors, unipolar switching sensors, and unipolar switching sensors with inverted output. The preferred Hall Effect switch for an interface according to one embodiment of the invention is a latched switching sensor. In the latched Hall Effect sensor, the output turns low with the magnetic south pole on the sensing side of the sensor and turns high with the magnetic north pole on the sensing side. The output of each Hall Effect sensor does not change if the magnetic field is removed. To change the output state, the opposite magnetic field polarity must be applied.

Figure 8B:
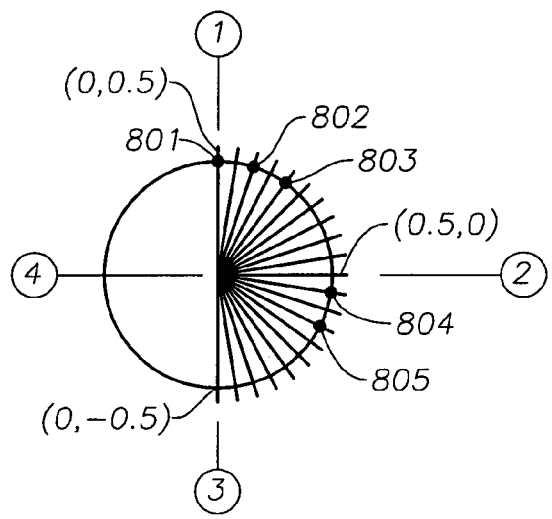
Figure 8C:
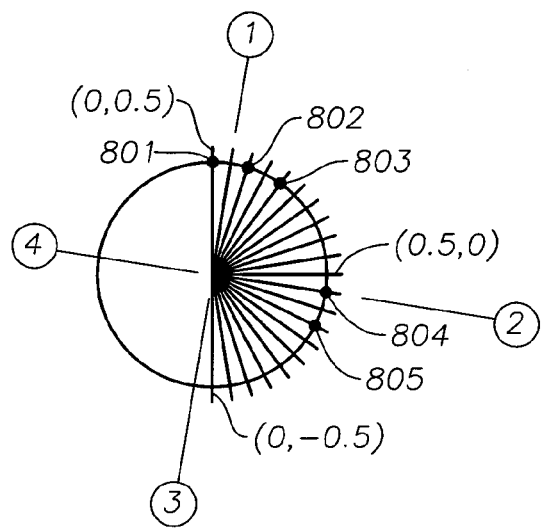
Figure 8D:
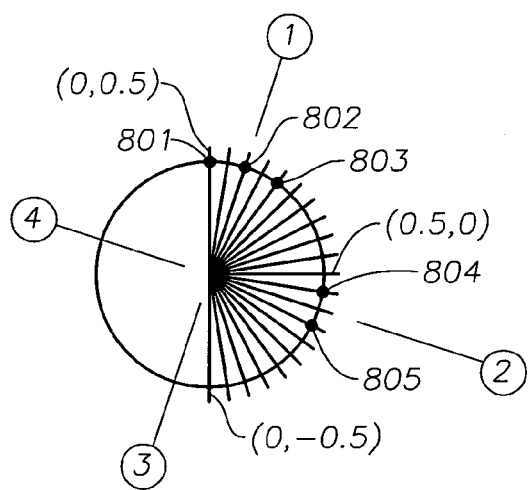
Figure 8E:
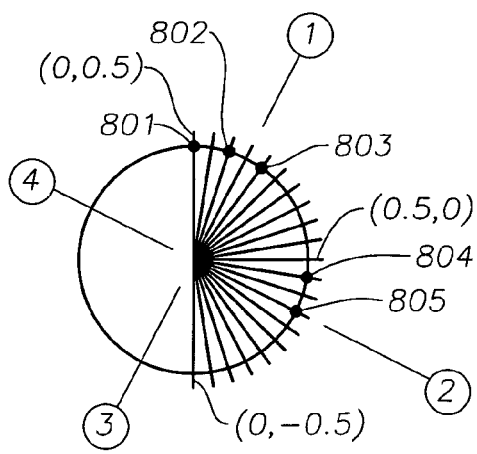
Figure 10:
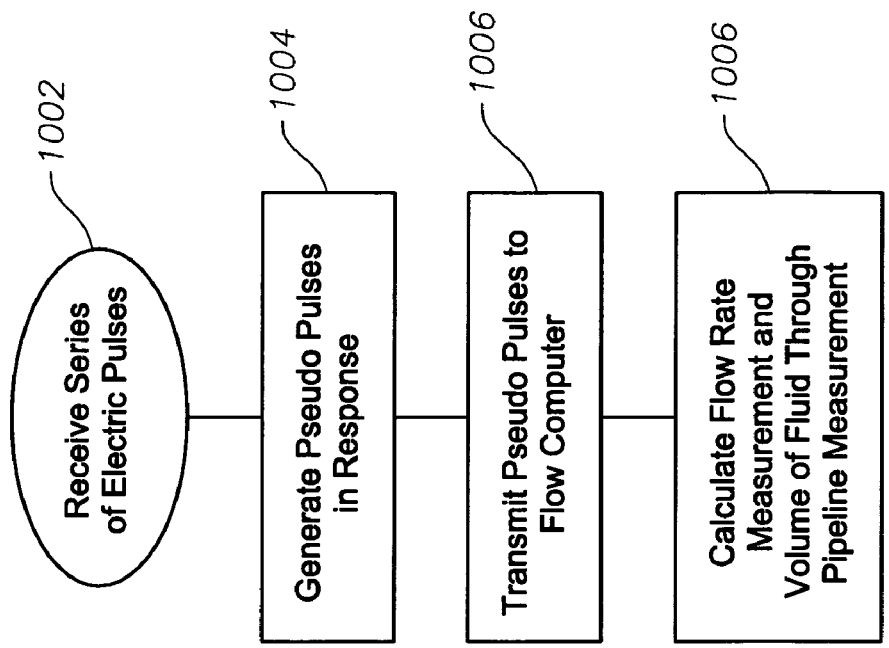
FIG. 10 shows a method according to the invention.

The pattern of the Hall effect sensors 708, 710 is notable. One reason why may be explained with respect to FIGS. 8B–8E. Referring to FIG. 8B, five Hall effect sensors 801–805 are angularly arranged as shown in FIG. 8A. The positions for a four-pole magnetic wheel are labeled 1, 2, 3, and 4 and are at right angles to each other. As can be seen in FIG. 8B, the four pole magnetic wheel is positioned so that pole 1 activates Hall effect switch 801. The magnetic pole then rotates 9 degrees, as shown in FIG. 8C. Upon this rotation, magnetic pole 2 activates Hall effect switch 804. The magnetic wheel then rotates an additional 9 degrees, as shown in FIG. 8D. Magnetic pole 1 is positioned to activate Hall effect switch 802. Referring to FIG. 8E, the magnetic wheel rotates another 9 degrees, where magnetic pole 2 activates Hall effect switch 805. As can be appreciated, when a magnetic wheel is utilized that has eight magnetic poles of alternating polarity, a pulse from a Hall effect switch is generated every 9 degree rotation of the magnetic wheel.

Figure 9:
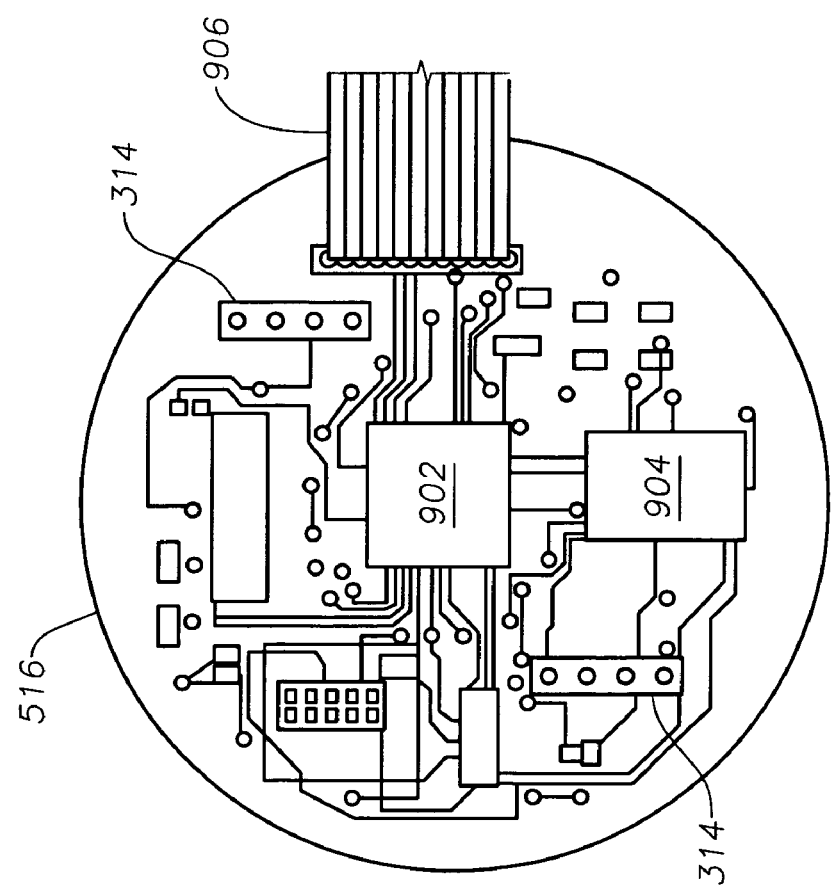
FIG. 9 is a top view of a circuit board suitable for the invention.

FIG. 9 illustrates the top of the circuit board 516. FIG. 9 shows microprocessor 902 with a clock, analog-to-digital converter 904, connector 314, computer cable 906 for connection to a flow computer, and various other circuitry.

During operation, as gas or fluid flows through the PD meter, its shaft turns. The shaft rotation likewise causes the attached radial magnetic wheel to rotate. The magnetic wheel includes, e.g., eight magnetic poles evenly distributed around the magnetic wheel. In a preferred embodiment, opposite-charged poles are alternated around the circumference of the magnetic wheel alternating between north and south. Proximate the magnetic wheel (i.e., a distance adequate to detect the movement of the magnets on the wheel) are a number of Hall Effect sensors.

In the embodiment of FIGS. 2–9, the interface is a device containing a radial, 8 pole magnetic wheel mounted on the PD's meter shaft, five Hall Effect sensors, two pressure sensors, and electronic circuitry which includes a microprocessor capable of communicating to a flow computer. Physically, the magnetic wheel is mounted to the shaft protruding from the PD meter. An adapter plate is mounted to the bottom of the explosion-proof housing containing the electronics board. The assembly is mounted on the PD meter, as the adapter plate's bolt pattern matches that of the meter. The adapter also provides the proper clearance for the magnetic wheel relative to the explosion-proof housing, and it centers the magnetic wheel relative to the Hall Effect sensors on the electronics board.

The rotation of the magnetic wheel on the PD meter shaft activates the Hall effect switches as explained above, generating pulses. The electronic circuitry passes each pulse to the interface microprocessor, which may be used to determine the direction of the meter's rotation, maintain the total pulses for each rotation direction, predict additional pulses for the time periods between adjoining Hall Effect switches, and communicate the pulse data to the digital flow corrector. The electronic circuitry of the interface (including an analog-to-digital converter) also transmits the two pressure sensor signals to the flow computer, where calculated flow rate values are compensated for temperature and pressure. With eight magnetic poles and five Hall effect sensors, 40 (8 magnetic poles×5 Hall effect sensors) pulses are generated per revolution of the PD meter's shaft. These five Hall effect switches are also used to determine the direction of rotation by examining the sequence of actuation for the Hall Effect switches (disruption of the patterned behavior of the pulses may indicate reversal of the magnetic wheel rotation). One advantage to the configuration shown in FIGS. 7 and 8 is that 90 degrees has been chosen for each repetition of the pulse pattern. The number of repeats of the switch pattern per rotation is ½ the number of poles. Of course, it is necessary to reliably determine when the magnetic poles are proximate the Hall effect sensors. A 90 degree spacing is large enough that no realistic flow speed is high enough that the software could miss volume flow through the PD meter because of missing an electric pulse from a Hall effect sensor.

It should be understood that the invention is not limited to one embodiment or configuration. However, certain concepts may be employed to determine a number of Hall Effect switches and magnet poles to employ in order to obtain a high resolution reading for fluid flow.

A method to establish the number of magnetic poles and Hall effect sensors is first to select an appropriate angle of rotation between consecutive pulses. The smaller the angle of rotation of consecutive pulses, the higher the resolution. However, there must be adequate spacing between consecutive Hall Effect sensors in order to ensure that the pulses generated by the Hall Effect sensors are distinct from one another as they arrive at the microprocessor in the interface. If there is not adequate spacing between Hall Effect sensors, the processor may fail to detect each pulse reliably. Consequently, an angle of rotation must be selected that is as small as possible, but still allows enough time for the microprocessor to process the interrupt associated with the new pulse. In the disclosed embodiment, 9 degrees was chosen. The next step is to divide 360 degrees by this angle to calculate the number of segments per rotation. At 9 degrees, there are 40 switches per rotation of the magnetic wheel.

Next, the number of Hall switches and the number of magnetic poles should be chosen. There must be at least one Hall effect switch and one magnet. Because each magnet has two poles, in the preferred embodiment the number of poles is multiple of two. Further, the number of Hall Effect switches times the number of poles on the magnetic wheel equals the total number of pulses generated by the total number of the Hall effect sensors per rotation of the magnetic wheel. Five Hall effect sensors and an eight pole magnetic wheel were chosen for the disclosed embodiment in order to obtain 40 pulses per rotation of the magnetic wheel. This provides adequate clarity of the magnetic effects on the Hall effect switches while keeping the cost of the interface relatively low.

Over the course of the day, the configuration of FIGS. 2–9 would accurately measure the volume of fluid traveling through the PD meter (and, by extension, the pipeline dependent upon the accuracy of the PD meter) based upon the total number of pulses. In order to obtain instantaneous or real time fluid rate flow measurements, however, higher resolution is required. Embodiments of the invention convert the shaft rotation of the PD meter to high resolution pulses by using the Hall effect sensor circuitry and a microprocessor-based pulse prediction algorithm and a weighting algorithm.

Resolution may be improved by the use of a pulse prediction algorithm. A pulse prediction algorithm programmed in the interface microprocessor magnifies the pulses from the Hall Effect sensors, resulting in a high resolution pulse counter. The pulse prediction algorithm uses a current rate of Hall effect switch status changes, a timer, and switch weighting numbers to project the pulses between switches. The pulse prediction algorithm determines a number of additional pulses between electric pulses from the Hall effect switches for the interface microprocessor to transmit to the flow computer.

In the disclosed embodiment, the pulse prediction algorithm multiplies the 40 actual pulses generated by the Hall Effect switches by 25 times, generating 1,000 pseudo pulses from the 40 pulses generated at the Hall Effect sensors. A textbook analysis of the structure of FIGS. 7 and 8 indicates a pulse every 9 degrees of the magnetic wheel, with the 1000 pseudo pulses generated by the pulse prediction algorithm likewise being distributed evenly. Periodically (for instance, once a second), data indicative of the pseudo pulses is sent to the flow computer from the interface microprocessor. This timing of this periodic transmission is independent of the pulse prediction algorithm.

In this hypothetical, a pulse from a Hall effect sensor is received at a first time. At calculated intervals thereafter (taking into consideration the frequency of previous pulses from the Hall effect switches), pseudo pulses are generated for transmission to the flow computer. These pseudo pulses are inserted at regular intervals into the actual pulse sequence, prior to the time the next pulse from a Hall effect sensor is expected to be received at the microprocessor. This allows the pseudo pulses to be transmitted to the flow computer every transmission period and a real time measurement of flow rate to be calculated by the flow computer based on these pseudo pulses. In the preferred embodiment, transmission of the actual pulses to the flow computer is omitted.

If the actual pulse from the Hall effect sensor arrives at its expected time, it is known that the flow rate of the fluid through the pipeline has not changed. If the pulse from the Hall effect sensor is late, it is known that the flow rate has slowed and the timing of the pseudo pulses should be recalculated for the next 9 degree rotation of the magnetic wheel. Only the 25 pseudo pulses corresponding to this 9 degrees of rotation are transmitted in this segment. This way, if the rotation of the PD meter shaft stops, the interface microprocessor sends only the 25 pseudo pulses corresponding to that 9 degree segment. If the pulse from the Hall effect sensor is early, it is known that the flow rate has sped up and the timing of the pseudo pulses should be recalculated for the next 9 degree rotation of the magnetic wheel. In this last case, it should also be ensured that all 25 pseudo pulses for this 9 degree segment are transmitted to the flow computer (since each represents a certain volume of flow through the PD meter). An accumulator may be used by the interface microprocessor to keep track of an accurate number of pseudo pulses between transmission periods. Use of such an accumulator ensures transmission of all 25 pseudo pulses.

One complicating factor is that in addition to a variable rotation speed for the magnetic wheel, there may be variation in magnetic pole strength, Hall effect switch sensitivity, placement of the Hall effect switches, placement of the magnetic poles, relative variation between the shaft and its attached magnetic wheel and the Hall effect switch array, etc. Consequently, even though the magnetic wheel may be rotating at a constant rate, the pulses from the Hall Effect sensors are not being generated at constant intervals. For example, for 1,000 pulses in the disclosed embodiment of eight poles and five Hall effect switches, there would ideally be 25 pulses per 9 degree rotation of the magnetic wheel. A pulse may be generated by the Hall effect switch somewhat earlier or later than 9 degrees, however. This would result in the weighting program placing, e.g., 20 pseudo pulses or 40 pseudo pulses, respectively, between consecutive electric pulses generated by the Hall effect switches.

One underlying assumption to infer from a pattern of received electric pulses that variations such as magnetic pole strength are present is that the flow rate (and thus shaft rotation) is constant. If the same pulse pattern over a full rotation is seen by the microprocessor, it is known that the magnetic wheel is turning at a constant rate (indicating a steady rate of fluid flow). Thought of another way, a comparison may be made of the time it takes for the magnetic wheel to make consecutive rotations. If these times of revolution are within a tolerance of 1–3%, a level of confidence exists that is adequately high to ensure that the real time flow rate measurement is accurate. With the PD meter's frequency of revolution constant, the microprocessor automatically adjusts the number of pulses between adjoining Hall effect switches to account for "early" or "late" Hall effect switch pulses that result from variations other than a change in flow rate. Such weighting resulting in accurate flow calculations.

The Hall effect switch weighting is calculated periodically when the PD meter's rate of rotation is constant, by determining the ratios of the time period between adjoining Hall Effect pulses to the time of the full meter revolution. These ratios and the number of high resolution pulses per revolution are used to determine the Hall Effect switch weighting.

One advantage to the design of the invention is the ability of the interface to be placed in an explosion resistant housing. Physical contact between the PD meter shaft and a flow computer interface precludes such an explosion resistant housing from being used. The presence of the explosive resistant housing has particular advantage in the pipeline industry, where a distinction is drawn between Division I and Division II devices. Division I devices are allowed much higher exposure to explosive gasses than Division II devices, an attribute generally sought after by those of ordinary skill because it generally allows for closer placement of the device to the pipelines used for fluid flow. Even if embodiments of the invention exist that would not qualify as Division I devices, these devices would still be safer and more explosion resistant than otherwise.

Other advantages to the invention include the absence of moving parts, which increases the longevity of the interface. In addition, installation is simplified leading to faster installation and lowered costs of installation.

Modifications of the disclosed embodiment can be made by one skilled in the art without departing from the spirit or teaching of this invention. The embodiments described herein are exemplary only and are not limiting. Many variations and modifications of the system and apparatus are possible and are within the scope of the invention. For example, the invention is not limited to Hall effect switches but rather could use any switch that generates a pulse in response to a passing magnetic field. Instead of a magnet-Hall effect switch pairing, light emitting diodes and receivers, or an inductive field transmitter and inductive coil sensor could be used although these may not be as advantageous as the disclosed embodiment. Accordingly, the scope of protection is not limited to the embodiments described herein, but is only limited by the claims which follow, the scope of which shall include all equivalents of the subject matter of the claims.

What is claimed is:

1. A system to measure fluid flow through a pipeline, comprising:
   a positive displacement (PD) meter, said PD meter comprising a shaft rotating proportionately to a volume of said fluid flow through said PD meter;
   a flow computer comprising a flow computer microprocessor;
   an interface coupled between said PD meter and said flow computer, said interface comprising at least one magnetic pole coupled to said shaft and at least one magnetically-sensitive sensor proximate said magnetic pole but not in contact with said magnetic pole, said magnetically-sensitive sensor generating an electric pulse when placed in the presence of said magnetic pole; and
   an interface microprocessor located inside said interface, wherein said at least one magnetically-sensitive sensor comprises a first sensor and a second sensor positioned relative to one another, said interface microprocessor generating pseudo pulses based on electric pulses from said first sensor and said second sensor, said pseudo pulses being timed in a weighted manner to distribute pseudo pulses at predetermined intervals.

2. The system of claim 1, wherein said magnetically-sensitive sensor is a latched Hall effect sensor.

3. The system of claim 1, said system comprises eight magnetic poles and five Hall effect sensors.

4. The system of claim 1, said system comprising eight magnetic poles and five Hall effect sensors, said five Hall effect sensors being arranged according to a geometry having four quadrants, with three of said five Hall effect sensors being in a first quadrant and two of said Hall effect sensors being in a second quadrant.

5. The system of claim 1, further comprising:
   a second microprocessor in said interface;
   an analog-to-digital converter in said interface; and
   pressure sensors at least partly in said interface, said pressure sensors providing pressure measurement data for said fluid;
   wherein said second microprocessor transmits data regarding a number of said electric pulses and said pressure measurement data.

6. The system of claim 5, wherein said second microprocessor transmits pulse data to said flow computer, said pulse data comprising data regarding electric pulses from said magnetically-sensitive sensors and regarding pseudo pulses generated by said second microprocessor.

7. The system of claim 1, said system providing a measurement of said volume of flow and a rate of flow for said fluid through said pipeline.

8. The system of claim 1, further comprising:
   a second multiprocessor in said interface,
   wherein said system provides a measurement of said volume of flow based on a count of pulses from said at least one magnetically-sensitive sensor and provides a rate of flow for said fluid through said pipeline based on pulses from said at least one magnetically-sensitive sensor and on pulses generated by said second multiprocessor.

9. The system of claim 1, further comprising:
   an explosion-resistant housing, at least a portion of said explosion-resistant housing interposed between said magnetically-sensitive sensor and said magnetic pole.

10. The system of claim 1, wherein at least 500 pseudo pulses are generated by said interface microprocessor.

11. The system of claim 1, wherein said at least one magnetic pole is an even number of magnetic poles arranged in a circle, a north magnetic pole alternating with a south magnetic pole around said circle.

12. A method to provide a real-time flow rate measurement for a fluid flow through a pipeline, comprising:
   receiving a series of electric pulses from a plurality of magnetically-sensitive sensors;
   generating a plurality of pseudo pulses in response to said electric pulses, said plurality of pseudo pulses being interspersed with said electric pulses;
   providing a flow rate measurement for said fluid flow through said pipeline, said flow rate measurement being based upon both said series of electric pulses and upon said plurality of pseudo pulses.

13. The method of claim 12, wherein there is uneven spacing between electric pulses in said series of electric pulses, said plurality of pseudo pulses being interspersed with said electric pulses based upon the uneven spacing.

14. The method of claim 12, wherein said magnetically-sensitive sensors are Hall effect switches.

15. The method of claim 12, wherein said magnetically-sensitive sensors are latched Hall effect switches.

16. The method of claim 12, wherein said magnetically-sensitive sensors are housed in an explosion-resistant housing and said series of electric pulses occurs by the proximity of magnetic poles to said magnetically-sensitive sensors.

17. The method of claim 16, said magnetic poles being mounted on a shaft protruding from a positive displacement meter.

18. The method of claim 12, further comprising:
   transmitting said pseudo pulses but not said electric pulses to a flow computer.

19. The method of claim 12, further comprising:
   calculating spacing of said pseudo pulses based upon said series of electric pulses.

20. An interface for use in a system to measure fluid flow through a pipeline, comprising:
   an interface configured to couple between a positive displacement meter and a flow computer, said interface comprising at least one magnetic pole coupled to a shaft and at least one magnetically-sensitive sensor proximate to but not in contact with said magnetic pole, said magnetically-sensitive sensor configured to generate electric pulses when placed proximate said at least one magnetic pole; and
   an interface microprocessor disposed at least partially within said interface, wherein said interface comprises at least one magnetically-sensitive sensor comprises a first sensor and a second sensor positioned relative to one another, said microprocessor configured to generate more than two pseudo pulses in response to at least a pair of said electric pulses.

21. The interface of claim 20, wherein said interface microprocessor is further programmed to receive a series of said electric pulses having a first timing relationship and generate a plurality of said pseudo pulses having a second timing relationship, said second timing relationship being dependent upon said first timing relationship.

22. The interface of claim 20, further comprising:
   at least one pressure sensor that generates pressure data;
   an analog-to-digital converter attached to said at least one pressure sensor, to generate a digital representation of said pressure data;
   a transmitter to transmit said pressure data.

* * * * *